Oct. 14, 1952

J. O. EDSON

TRIGGER CIRCUIT

Filed May 26, 1950

2,614,142

INVENTOR
J. O. EDSON

BY N. S. Ewing

ATTORNEY

Patented Oct. 14, 1952 2,614,142

UNITED STATES PATENT OFFICE 2,614,142

TRIGGER CIRCUIT

James O. Edson, Warren Township, Somerset County, N. J., assignor to Bell Telephone Laboratories, Incorporated, New York, N. Y., a corporation of New York Application May 26, 1950, Serial No. 164,363

11 Claims. (Cl. 171—97)

This invention relates to signal translation systems of the type using negative resistance units as the active elements.

It is the general object of the invention to provide new and novel electric circuits of the type that are generally referred to as double stability or trigger circuits.

It is also an object of this invention to utilize two-terminal negative-resistance units of the passive type in electrical trigger circuits having two conditions of stability which may be triggered or changed from one to the other stable condition by successive pulses of the same polarity.

It is a feature of the invention that small inert or passive type negative resistance elements are used in a double stability circuit in such a manner as to minimize the space and power requirements for the production of discontinuous wave forms.

The double stability circuits that will be described herein are similar to those disclosed by J. G. Kreer in his application Serial No. 164,361, filed concurrently herewith. This invention is by way of improvement on those circuit arrangements and makes possible the triggering of the double stability circuit from one to the other of its stable conditions with a reversing impulse of exceptionally small magnitude.

The subject invention is characterized by its use of two current-conducting paths or circuit meshes, in each of which current flows continuously but in unequal amounts. Each of these paths employs a variable resistance element which may be either voltage controlled or current controlled. These variable resistance elements are characterized by voltage-current characteristics which when graphically displayed take the form of an N curve in the case of the current-controlled type and an S curve in the case of the voltage-controlled type. In either type, as the current through the unit or the voltage impressed upon the unit, as the case may be, is progressively increased from zero value to some maximum value, there is traversed a first region of positive resistance, a region of negative resistance, and a second region of positive resistance. The current-controlled units are sometimes referred to as series-type units or open-circuit stable units. The voltage-controlled units are sometimes referred to as shunt-type or short-circuit stable units. In either type, the negative resistance region is an unstable one that is not experimentally observed unless the series-type variable resistance is connected in series with a fixed resistance of greater magnitude than its maximum negative resistance or the shunt-type variable resistance is connected in parallel with a fixed resistance of value less than the minimum negative-resistance value of the variable resistance unit. As used in the double stability circuits of this invention, the negative resistance units are connected with fixed resistance units of such magnitude that the negative resistance region is unstable.

In the specification which follows, there are shown current-voltage characteristic graphs that are representative for both the series- and shunt-type variable resistance units. The graph of the series-type unit, being an N curve, shows three theoretically possible values of current for a given value of voltage across the unit. The characteristic graph of the shunt-type of unit is an S curve, which shows three theoretically possible values of voltage for a given value of current. Thus, when the variable resistance unit is combined with a fixed resistance unit of the proper magnitude, there exists a region of instability in which an increase in one factor, be it current or voltage, produces a decrease in the corresponding factor. It is this characteristic of the negative resistance unit that is utilized in this invention.

In the circuit embodiments that are to be described herein, the invention employs a pair of these negative resistance units in a pair of circuit meshes in which continuous but unequal currents flow. The sources of potential and connected resistors are adjusted to such values that each negative resistance unit would be operated in its negative resistance region if that condition were a stable one. Because each variable resistance unit is associated with a fixed resistor, the value of which is chosen such that the region of negative resistance is unstable, the current flowing in one circuit branch will always be larger than that flowing in the other and will be of such magnitude that one resistance unit is operated in its second or upper region of positive resistance while the other is simultaneously operated in its first or lower region of positive resistance. A "memory circuit," which comprises energy storage means, interconnects the two circuit meshes and stores energy in accordance with the difference in current flow through the variable resistance units. Provision is made for intermittently or periodically forcing both negative resistance units to momentarily operate in their first or lower positive resistance region. This momentary disturbance promotes redistribution of the energy which has been stored in the energy storage or "memory" circuit and causes a revision of the current-conduction states of the two variable resistance units, i. e., the previous high current branch becomes the low current branch and vice versa. This revised current condition prevails until a second disturbance again promotes another energy redistribution and another current-conduction revision.

In accordance with this invention, there is provided a low impedance pulse conduction path for the reversing pulses such that the magnitude of the impulse may be maintained at a minimum.

The manner in which the invention accomplishes the above-mentioned objects will be more clearly understood from a consideration of the following descriptions of several preferred embodiments thereof when considered in conjunction with the drawings, in which.

Figure 1:
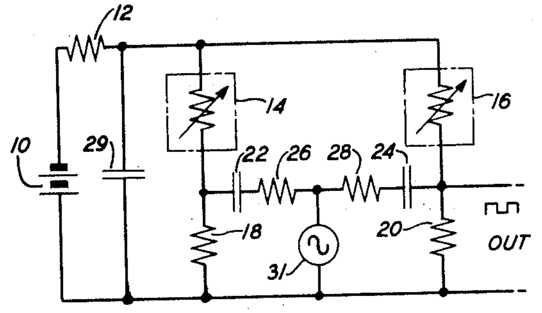
Fig. 1 is a schematic circuit arrangement of one embodiment of the invention in which series-type negative resistance units are employed in the current-conduction paths.

Referring now to Fig. 1, there is disclosed the arrangement of a double stability or trigger circuit in accordance with the invention in which a current source or battery 10 supplies current through a current-limiting resistor 12 to the substantially identical series-type negative resistance elements 14 and 16, each of which elements is here symbolically shown as a variable resistance in a broken line rectangle. Negative resistors 14 and 16 may be any of a variety of known arrangements, such as arc discharge devices, ionic discharge devices, electronic discharge devices, or non-ohmic semiconductive substances, such as germanium crystals or the well-known heat-treated oxides of manganese, cobalt, or other suitable metals which have been given the generic title of varistors. In this described embodiment, it will be assumed that elements 14 and 16 are thin-film resistors of the type known as flake-type "thermistors," which are described in Patent 2,414,793, January 28, 1947, to J. A. Becker. It should, however, be understood that variable resistors 14 and 16 may equally well be other types of known non-ohmic semiconductor substances whether in flake or bead form or in the form of point-type crystal rectifiers, such as the germanium diode, so long as they possess a region of negative resistance in their voltage-current characteristics. For that matter, as will be described in connection with Fig. 3, the variable elements 14 and 16 may be the recent publicized semiconductor triode which has been given the appellation of "transistor." It is thus seen that for the purpose of this invention, it is sufficient if elements 14 and 16 have current-voltage characteristics which take the form of an N curve (Fig. 2), such that a region of negative resistance is flanked by two regions of positive resistance. There are three theoretically possible values of current through the unit for a single value of voltage across it. Current-limiting resistor 12 is connected in series between the battery 10 and the variable units 14, 16 and, in conjunction with the other circuit impedances, serves to limit the current flowing from source 10 to a value that is less than twice that of the current corresponding to the minimum voltage 40′ and more than twice that of the current corresponding to the voltage maximum 38′ on the curve 32 of Fig. 2, which will be described hereinafter. The substantially identical impedances or resistors 18, 20 are connected in series between the resistance elements 14, 16, respectively, and the lower terminal of source 10. Capacitors 22 and 24 are connected in series with protective resistors 26, 28 and are shunted between the junction points of the negative and fixed resistors 14, 18 and 16, 20. Pulse generator 31 is connected between the junction of resistors 18, 20 and the junction of protective resistors 26, 28, as shown. In accordance with the present embodiment, this generator is so poled relative to the battery 10 that when it delivers voltage impulses across resistors 18 and 20, the current flow in variable resistors 14 and 16 is reduced. Capacitor 29 is shunted across the parallel conduction paths and across the series combination of battery 10 and current-limiting resistor 12. In this embodiment, this capacitor 29 provides a lower impedance path for the pulses from source 31. Therefore, a given pulse voltage produces in variable resistors 14 and 16 greater currents than are produced by the same voltage from source 10.

Figure 2:
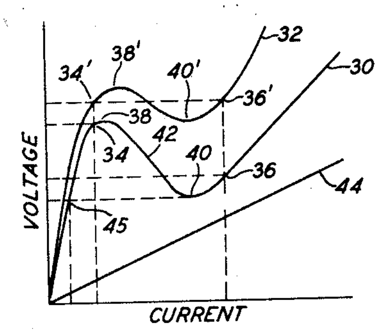
Figs. 2 and 5 are representative current-voltage characteristics of negative resistance units, to which references are made in the following description.

The general principles governing the choice of suitable values for current source or battery 10, current-limiting resistor 12, padding resistors 18, 20, and shunting capacitor 29 will be explained with reference to the N-shaped current-voltage characteristic curves of Fig. 2. Referring to that figure, curve 30 indicates the manner in which the voltage across a series-type or current-controlled negative resistance unit changes as the current flowing through the unit is varied. This curve is representative of the general class of series-type units and is not individual to any specific one. It is indicative of the variation that would be noted across a thin-film resistor composed of one or more of the oxides of manganese, nickel, cobalt, or other suitable metal if it were connected in series with a source of variable unidirectional current and a large valued stabilizing resistor. Thin-film resistors of this type are described by J. A. Becker in Patent No. 2,414,793 dated January 28, 1947. The variation in voltage or voltage drop across the thermistor in response to a variation of current is similar to that indicated by curve 30.

From this curve, it will be noted that the unit has a region of negative resistance, indicated by reference numerals 38 and 40, in which an increase of current produces a corresponding decrease in voltage across the unit. This region of negative resistance is flanked on the left by a first region of positive resistance from zero to numeral 38 and is flanked on the right by a second region of positive resistance to the right of reference numeral 40. These first and second regions are occasionally referred to as the low current and high current regions of positive resistance, respectively. There is only one appropriate value of voltage for any specific value of current flowing through the resistance unit, but for any given voltage drop across the resistor, there may be as many as three appropriate values of current flowing in it. Because the negative resistance region between reference numerals 38 and 40 is a region in which a change in the current flowing through the device produces an oppositely directed change in the voltage across it, it is a region of instability and is not one in which the current will come to rest unless the resistance unit is in series connection with a stabilizing resistor of sufficiently great value.

If the stabilizing resistor is greater than the maximum negative resistance of the negative resistance unit, any current value may be stably maintained. This maximum negative resistance occurs at a current corresponding to point 42 at which curve 30 has its maximum negative slope.

The constant slope curve 44 (Fig. 2) indicates the potential drop across one of the connected padding resistors 18 or 20 as the current through the resistor is progressively increased. The combined current-voltage characteristic of a serially-connected series-type negative resistance element and its associated padding resistor 18 or 20 when chosen in accordance with this invention are shown by curve 32. It will be noted from this curve that the negative resistance region, as indicated by the curve portion between reference numerals 38′ and 40′ is slightly constricted from that for the negative resistance unit alone, as indicated by the curve portion 38, 40 of curve 30. This compression of the negative resistance region is caused by the addition of the padding resistor and is a function of the magnitude of this resistor.

If the associated padding resistor is less than the above-described maximum negative resistance, curve 32 will include such a region as indicated between the numerals 38′, 40′. Any change in current flowing through the unit that brings the operation within the curve portions 38′, 40′ of its current-voltage characteristic promotes the regenerative action that is inherent in this device and causes the current to quickly traverse this region 38, 40 of negative resistance and to come to rest at an appropriate value in its first low current or second high current region of positive resistance. It is this characteristic of the negative resistance element that is put to useful purpose in the subject invention.

It may be seen that the padding resistor should not be of such value that the negative resistance portion of curve 32 is completely eliminated. In actual practice, the padding resistor should be sufficiently below this limiting value to allow a suitably large or extended region of negative resistance, as seen on the current-voltage characteristic curve 32, to permit the desired trigger action. One consideration with regard to the required region of negative resistance is that increased stability with respect to extraneous voltage impulses may reasonably be expected to accompany an extended negative resistance range.

An analogous situation exists in the shunt-type voltage-controlled or short-circuit stable unit in which the current varies as the voltage across the unit is varied. This characteristic of the shunt-type unit will be later discussed with reference to Fig. 6. It is mentioned at this time in order to emphasize that each type of unit has a region of negative resistance for electrical quantities within a predetermined or specified range of values and that, when associated with the proper circuit components, this region of negative resistance is an unstable one.

Current source or battery 10 and current-limiting resistor 12 may be suitably proportioned over a rather wide range of values, the choice of which will to a large extent determine the magnitude of the pulse from source 31 that provides the desired trigger action. In general, for a given operating condition, a reduction in the potential of battery 10 and in the magnitude of resistor 12 will also reduce the required magnitude of the reversing pulses from source 31. Current source 10 and resistor 12 are chosen of such values that when connected in series with the parallel conducting paths including negative resistance units 14 and 16, the total current flowing through resistor 12 lies between the values of twice the current value corresponding to maximum voltage across the serially-connected negative resistance element and fixed resistor (point 38′, curve 32) and twice the current value at the point of minimum voltage across these combined resistance elements (point 40′).

From an inspection of curve 32, it will be seen that when the total current in the circuit is maintained between these two limiting values, negative resistance units 14 and 16 may not both simultaneously be operating in their high current or low current positive resistance regions. Therefore, one of these negative resistance units must operate in its low current positive resistance region to the left of point 38′ at the same time that the other is operating in its high current positive resistance region to the right of point 40′.

Capacitors 22 and 24 are preferably of such size that a substantial fraction of the potential difference that exists across these units at the beginning of the reversing pulse from source 31 continues to exist across them at the end of the pulse period. The maintenance of this potential differential is desirable in order that the current-conduction state of each negative resistance unit 14 and 16 will be reversed after each pulse interval in the manner that will be presently described. Pulse source 31 should be capable of delivering a voltage impulse of sufficient magnitude to reduce momentarily the voltage across whichever one of the negative resistance units 14 or 16 is at the moment operating in its high current state to a value that is less than the minimum voltage value 40, as indicated on curve 30. The pulse from source 31 is preferably of a duration that is a substantial fraction of the time required for the negative resistance units 14 and 16 to change their current-conduction states. Therefore, the duration of this pulse may be increased when slow-speed negative resistance units are used and decreased when high-speed units are used.

In the tested embodiment of Fig. 1, suitable values for the designated components were as follows:

| | |
|---|---|
| Battery 10 | 42 volts |
| Current-limiting resistor | 10,000 ohms |
| Capacitors 22, 24, 29 | 125 microfarads each |
| Resistors 26, 28 | 330 ohms |
| Pulse source 31 | 6 volts |
| Resistors 18, 20 | 3300 ohms |

Negative resistance units 14 and 16 were flake-type thermistor units composed of oxides of nickel, manganese, and cobalt such as are described in the previously mentioned Becker Patent 2,414,793. They had a time constant of about 100 milliseconds or less and a current-voltage characteristic such that a maximum voltage of about 18 volts (point 38, curve 30) coincided with a current value of about .13 milliampere and a minimum voltage point 40 of about four and one-half volts corresponding to a current value of about 10 milliamperes. At this point, it might be noted that resistors 26, 28 are not essential to the operation of this tested embodiment but are inserted for the purpose of protecting negative resistors 14 and 16 from overload currents.

Although in the above-described embodiment the values of components in the two current-conduction paths have been shown to be substantially similar, modifications of this circuit are conceivable in which the characteristics of the negative resistance units 14, 16 and the values of these series-connected resistors 18, 20 are substantially different. This also applies to the circuits to be disclosed hereinafter.

The manner in which the double stability unit of Fig. 1 operates to alternately change from maximum current conduction to minimum current conduction in each conducting path may be best apprehended if its operation is traced through a half cycle from an assumed set of conditions. For this purpose, assume that the total current from battery 10 is limited to the sum of values corresponding to points 34′ and 36′ on curve 32 and that negative resistor 14 and padding resistor 18 initially constitute the maximum current-conduction path. Under these conditions, the current flowing in negative resistance unit 16 is less than that in unit 14, but the voltage across unit 16 is greater than the voltage across unit 14. The voltage drop across padding resistor 18 exceeds that across resistor 20, and capacitors 22 and 24 are charged with the negative terminal connected to resistor 18. If source 31 now supplies a voltage impulse between the common terminal of resistors 18, 20 and the common terminal of resistors 26, 28, the polarity of which with respect to the common terminal of resistors 18, 20 is the same as the polarity of source 10, the voltage at the junction of the negative resistance units and their connected padding resistors is increased by the pulse magnitude. The impedances of capacitor 29, as well as the impedance of each of capacitors 22, 24 and resistors 26, 28, is low relative to the impedances of units 14 and 16. Therefore, the voltage across the negative resistance units is reduced by the pulse value, which in the case of unit 14 is sufficient to lower it below the voltage minimum 40 on curve 30. Referring to this curve, it will be noted that when the voltage across the negative resistance unit is reduced below this minimum voltage value 40, the unit is brought within its negative resistance range 38, 40, which range is an unstable one. The current in the unit cannot rest between reference points 38 and 40, so it quickly traverses this region to rest at a value in the low current positive resistance region of its characteristic corresponding to the new voltage value 45. Just before the beginning of the pulse from source 31, negative resistance unit 16 was operating at point 34 in its low current positive voltage range, and the voltage across it was greater than that across unit 14. Upon the application of the voltage pulse from source 31, the voltage across this unit is lowered by the same amount as that across unit 14. However, because it was initially operating in its low current positive resistance range, its current conduction is only slightly lowered and remains at a higher value than the revised value for unit 14 (represented by point 45). Capacitor 22 discharges through resistor 18 and tends to temporarily maintain the original potential value at the lower terminal of negative resistance unit 14. As was previously stated, during this pulse interval, the voltage across unit 16 is now greater than that across unit 14; and both units are momentarily operating in their low current conditions. If the pulse from source 31 is terminated before this condition has materially changed, the potential of source 10 again becomes active to establish the original total current flow in the combined paths. Since both paths are substantially the same, the current increase in both paths is uniform, and negative resistance unit 16 is forced through its point 38 of voltage maximum and into its region 38, 40 of instability before unit 14 reaches its voltage maximum 38. The current in unit 16 quickly traverses the unstable region between 38 and 40. Because the total current flow in the circuit is limited by resistor 12 to a value which is less than twice the current value corresponding to the voltage minimum point 40′ but more than twice the current value corresponding to the voltage maximum point 38′, the current in the two circuit branches again stabilizes at the values corresponding to points 34′ and 36′, but unit 16 is now carrying the greater current. Hence, the current conduction through unit 14 is now limited to its low current state. The redistribution of energy in capacitors 22, 24 continues in accordance with these revised current conditions and ultimately stabilizes with the difference in potential across these units the same in magnitude as previously existed but reversed in polarity such that the negative terminal is now connected to the upper terminal of resistor 20. At the time of each change in the amounts of current flowing through padding resistor 20, there is a change in the potential drop across this resistor, which change is available at the output terminals designated Out in the form of a discontinuous wave substantially rectangular in shape. These current-conduction conditions are maintained until a next succeeding impulse from source 31 causes negative resistance unit 16 to revert to its low current positive resistance region of operation and unit 14 to revert to its high current positive resistance condition in the manner which has been previously described.

As described in the foregoing paragraphs, the pulse source 31 is poled in a direction to reduce the potential across the variable-resistance current-conduction paths. However, it will be apparent from a study of curves 30 and 32 of Fig. 2 that the circuit of Fig. 1 could also be operated with the polarity of pulse source 31 reversed, the added pulses being of sufficient magnitude to enable both variable resistance units to operate on the upper positive portion of the current-voltage characteristic for the duration of the pulse.

Figure 3:
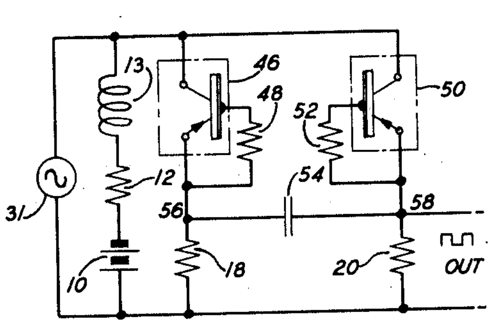
Fig. 3 is a schematic of a double stability circuit in accordance with the invention in which negative resistance units of a specific type known as "transistors" are used.

Fig. 3 shows the schematic arrangement of a different embodiment of the invention in which each negative resistance unit 46, 50 comprises a semiconductor triode of the type which has become commonly known as a transistor, and which is described and claimed in Patent 2,524,035, issued October 3, 1950 jointly in the names of John Bardeen and W. H. Brattain. Each of these units comprises a form of block of semiconductor material such as N-type germanium, with which are associated three electrodes. One of these, known as the base electrode, makes low resistance contact with one face of the germanium block. It may be a plated metal film. The others, one termed "emitter" and the other termed "collector," preferably make point-type contact with the other face of the block. The unit is connected in the manner described and claimed in Patent 2,585,078, issued February 12, 1952, H. L. Barney, in which a resistor 48 or 52 is connected between the base electrode and the emitter electrode. As is there described, this transistor is characterized by a ratio of short-circuit collector current increments to corresponding emitter current increments, which substantially exceeds unity for electrode current-voltage conditions within a preassigned range of values. When such a semiconductive triode is connected, as shown in Fig. 3, the points 38 and 40 (curve 30, Fig. 2) of maximum and minimum voltage across the unit are functions of the magnitude of the shunting resistor 48 or 52. Thus, changes in the magnitude of this resistor permit placing the points 38 and 40 of maximum and minimum voltage at the desired values. Transistors 46 and 50, when arranged as shown, constitute series-type negative resistance units having a representative current-voltage characteristic, as shown by curve 30 of Fig. 2. Each of these negative resistance circuits is connected in series with a padding resistor 18, thereby forming a pair of parallel conduction paths across which is connected an external network. Resistors 18 and 20 are chosen in accordance with the principles previously described in connection with Fig. 1. A capacitor 54 connects the junction point 56 between transistor 46 and resistor 18 to junction point 58 between transistor 50 and resistor 20. The external network comprises current source or battery 10, current-limiting resistor 12, and inductor 13 in series connection with the constant current pulse generator 31 shunted across this series arrangement. This external network is connected across the parallel conducting paths and serves to interconnect these paths as indicated. The same considerations control the choice of magnitude for battery 10, current-limiting resistor 12, and padding resistors 18 and 20, as were described in connection with the circuit arrangement of Fig. 1. As was previously explained, by limiting the total current flow in the circuit to a value which lies between the two limiting values of less than twice the current corresponding to the voltage minimum 40' across the combined negative resistance and padding resistor, and more than twice the current corresponding to the voltage maximum 38' across these units, it is possible to insure that the stable current-conduction states in the two parallel circuit branches including transistors 46 and 50 are unequal. If it is assumed that transistor 46 is at a given instant conducting a high current value, transistor 50 will be conducting a low current value, and the potential drop across padding resistor 18 will exceed that across resistor 20; capacitor 54 will be charged with terminal 56 having a negative sign with respect to terminal 58. If now a reversing current impulse is supplied by source 31 in opposite polarity to the polarity of battery 10, it is blocked out of the circuit path comprising battery 10, resistor 12, and inductor 13 because of the back electromotive force contributed by inductor 13 to maintain the existing current conditions in that branch of the circuit. A low impedance path for the pulse from source 31 is provided through the parallel negative resistance units 46, 50, and current flowing through these units causes them momentarily and simultaneously to operate in their low current positive voltage regions. The marked reduction in current flow through unit 46 causes a corresponding decrease in voltage drop across padding resistor 18, and capacitor 54 starts to discharge and maintain the potential state at point 56. At the termination of the pulse from source 31, the voltage across unit 50 is greater than that across unit 46, and unit 50 is accordingly forced through its negative resistance region (38, 40, curve 30) to become the high current path. Concurrently, unit 46 is restrained to its low current positive resistance region of operation and becomes the low current path. This condition maintains until a subsequent pulse from source 31 causes the circuit to revert to its original current-conduction condition. Concurrent with the changes of current flow in resistor 20, discontinuous voltage pulses which may be rectangular in shape are produced at output terminals designated Out.

Figure 4:
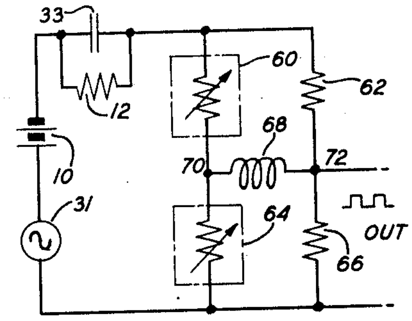
Fig. 4 is a schematic of a double stability circuit in accordance with the invention in which shunt-type negative resistance units are utilized.

Fig. 4 is a schematic of a circuit in accordance with the invention in which the negative resistance units 60, 64 are shunt-type or voltage-controlled negative resistance elements. Each of these elements may have a current-voltage characteristic such as is shown by representative curve 74 of Fig. 5. As will be noted from this curve, this current-voltage characteristic is distinguished by the fact that as the voltage across the negative resistance unit is increased from zero, the current through the unit first increases until it reaches a maximum value at reference point 76, then decreases until it reaches a current minimum at point 78, after which further increase of voltage causes increased current flow. It is thus seen that each of these elements possesses a region of negative resistance between reference numerals 76, 78, which region is enclosed by a first or low voltage region of positive resistance and a second or high voltage region of positive resistance. These units are distinguishable from the series-type units which have been previously described herein in that there is only one value of current corresponding to each value of voltage across the unit, whereas there may be as many as three appropriate values of voltage across the unit for a single value of current. This characteristic is substantially the reverse of the current-voltage characteristic of the series-type negative resistance elements.

Elements 60, 64 are connected in series with potential source or battery 10, pulse source 31, and a paralleled current-limiting resistor 12 and shunting capacitor 33. Padding resistors 62, 66 are connected in series and are shunted across the negative resistance units to form therewith parallel current-conduction paths. Inductor 68 is connected between junction point 70 of the negative resistance units and junction point 72 of fixed resistors 62, 66. Output terminals designated Out are connected across resistor 66. In this described arrangement, pulse source 31 is preferably a source of intermittent constant-voltage impulses.

Figure 5:
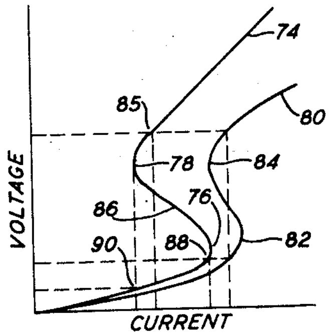

The considerations governing the choice of values for the various components of the Fig. 4 arrangement are similar to those that have already been described in connection with the arrangements of Figs. 1 and 3. Because negative resistance elements 60, 64 are shunt-type arrangements which are short-circuit stable, the connected padding resistors 62, 66 shall not be less than the minimum negative resistance of the negative resistance elements. The region of minimum negative resistance of these elements is approximately indicated by reference numeral 86 on curve 74. The current-voltage characteristic of one of these negative resistance elements and its paralleled fixed resistor is indicated by curve 80, which shows a current maximum approximately indicated by reference numeral 82 and a current minimum approximately indicated by reference numeral 84. As in the case of the series-type negative resistance element, the current-voltage characteristic 80 of the negative resistance element, together with its connected fixed or padding resistor, shows a region of negative resistance between reference numerals 82 and 84 which is somewhat compressed or constricted from the negative resistance region of the negative resistance element alone. The potential of battery 10 and the resistance of resistor 12 are chosen of such values that the potential difference across the serially-connected negative resistance units 60, 64 shall always be greater than twice the voltage across the combination of one of these units and its paralleled fixed resistor at the point 82 of current maximum and less than twice the voltage across the combination at the point 84 of current minimum. As is indicated in Fig. 5, when these values are chosen within these limits, a total current T will flow in the circuit, which value intersects the combined current-voltage characteristic 80 at three points. Two of these points are in the positive resistance regions, and a third is in the unstable negative resistance region. The corresponding voltages across the negative resistance elements are indicated at point 85 in the high voltage range and point 88 in the low voltage range. It will be noted that a larger current accompanies point 88 in the low voltage operating range than accompanies point 85 in the high voltage operating range. Under these conditions, there will not be a stable rest state in which the voltage across one negative resistance unit is equal to that across the other unit. Analogous to the series-type arrangement, one of these shunt-type negative resistance units will now operate in its high voltage positive resistance region above reference point 78 on curve 74, while the other is operating in its low voltage region below reference point 76 on this curve. The sum of the currents through negative resistance unit 60 and its paralleled resistor 62 is equal to the sum of the currents through negative resistance unit 64 and its paralleled resistor 66.

As will be noted from the drawing, the serially-connected variable resistance units 60, 64 and shunting capacitor 33 form a low impedance path for the alternating components of the pulses from the constant voltage source 31.

The manner of operation of this shunt-type arrangement is similar to that which has been previously described for the series-type negative resistance units. Assume an initial condition in which negative resistor 60 is in its high voltage state and negative resistor 64 is in its low voltage state. A relatively low value of current will flow through negative resistor 60, and a relatively high value of current will flow through negative resistor 64. Correspondingly, a relatively high value of current will flow through fixed resistor 62, and a relatively low value of current will flow through fixed resistor 66. The difference between these high and low values of current flows through inductor 68 and creates a magnetic field around this inductor. Because of the energy that is stored in this magnetic field, the current conduction through inductor 68 cannot change instantaneously. Therefore, if an impulse is now supplied from source 31, the stored energy in the magnetic field about inductor 68 tends to maintain the current condition at point 70, and the currents flowing through negative resistance units 60 and 64 will be equally reduced so that the original difference between the currents that were flowing through these units remains substantially unchanged. This impulse lowers the current flowing through negative resistor 60 to a value less than its current minimum 78, and this unit reverts to its low voltage operating condition at point 90 in which the voltage across it is less than that across negative resistance unit 64. At the termination of the impulse from source 31, source 10 is again effective to increase the current flowing through the negative resistance units, and negative resistance unit 64 reaches its current maximum condition 76 and is forced through the negative resistance portion of its characteristic before unit 60 reaches its current maximum condition. Resistance unit 64, therefore, transfers to its high voltage state (point 85, curve 74), and unit 60 is maintained in its low voltage state at point 88 on the curve. Under these revised conditions, a relatively low value of current now flows in fixed resistor 62, and a relatively high value of current now flows in fixed resistor 66. During this pulsing interval and immediately afterward while the current redistribution is being effected, the current flowing through inductor 68 decreases to zero and then builds up to a stable value in the reversed direction consistent with the revised current conditions. Energy is again stored in the magnetic field about this inductor in accordance with the reversed current flow condition. This current-conduction condition maintains until a subsequent impulse from source 31 is again effective in the low impedance path including negative resistance elements 60, 64 and shunting capacitor 33 to again reverse the current-conduction conditions and restore them to their original state. Concurrently, with the changes in the magnitude of the current flowing in resistor 66, there appears a discontinuous voltage wave of substantially rectangular shape at the output terminals designated Out.

It is evident from the preceding description that the subject invention may be practiced through the use of a variety of circuit arrangements, some preferred ones of which have been described herein. It should be appreciated that there exist several suitable negative resistance units either of the series or shunt type which may be used with equal facility to those that have been described herein in carrying out this invention. In view of this, it is to be expected that variations of the invention which do not depart from the spirit and scope will present themselves to those skilled in the related art.

What is claimed is:

1. An electrical trigger circuit comprising a pair of variable resistance elements each of which is characterized by one region of its current-voltage characteristic wherein either of two stable operating conditions obtains for a given set of conditions, and by regions adjacent to said one region of said characteristic wherein only a single stable operating condition obtains for a given set of conditions, a pair of fixed resistors connected to said variable elements and forming therewith a pair of current-conducting paths, an impedance interconnecting said current-conducting paths and connected at the junctions of said fixed resistors and said variable resistance elements, an external network connected across said current-conducting paths, said network comprising a continuous source of unidirectional current of a given polarity, said source when so connected being limited to current flow sufficient to product current corresponding to values within said one region in each of said variable-resistance elements simultaneously, and low impedance means to momentarily change the current-voltage conditions of said variable elements to those corresponding to said adjacent regions.

2. An electrical trigger circuit comprising a pair of variable resistance elements each of which is characterized by a current-voltage characteristic including a range of current-voltage conditions wherein either of two stable operating states obtains for a given set of conditions, and outside of which range only one stable operating state obtains for a given set of conditions, a pair of fixed resistors connected to said variable elements and forming therewith a pair of current-conducting paths, an impedance interconnecting said current paths and connected at the junctions of said fixed resistors and said variable resistance elements, an external network connected across said current-conducting paths, said network including a source of unidirectional potential of magnitude suitable to establish for both of said variable elements current-voltage conditions corresponding to said range, and pulse producing means connected in a low impedance path to momentarily change the current-voltage conditions of said variable elements to those corresponding to conditions outside of said range.

3. An electrical trigger circuit comprising a pair of variable resistance elements and a pair of connected fixed resistance elements forming therewith a pair of current-conductive paths, each of said variable resistance elements in common with its said fixed resistance elements having a variational resistance characteristic which includes a predetermined range of electrical quantities within which either of two stable rest states obtains for a given set of conditions, and outside of which only a single stable rest condition obtains for a given set of conditions, an energy storing impedance path interconnecting said current-conductive paths, an electrical source connected across said paths, the magnitude of which when so connected is sufficient to give rise to quantities within said predetermined range in each of said variable resistance elements simultaneously, whereby a different one of said stable rest conditions obtains in each of said elements, and a low impedance pulse transmission path which includes both of said variable resistance elements and a source of intermittent electrical pulses but which excludes said electrical source.

4. An electrical trigger circuit comprising a pair of variable resistance elements and a pair of connected fixed resistors forming therewith a pair of current-conduction paths, each of said variable resistance elements in combination with its fixed resistor having a variational resistance characteristic which includes a predetermined range of electrical quantities within which either of two stable rest conditions obtains for a given set of conditions, and outside of which only a single stable rest condition obtains for a given set of conditions, an energy storage impedance path interconnecting said current-conduction paths, an electric source connected across said paths, the magnitude of said source being sufficient to give rise to quantities within said predetermined range in each of said resistance elements simultaneously, whereby a different one of said stable rest conditions obtains in each of said elements, and means to momentarily change the effective value of said electric source to give rise momentarily to electrical quantities outside of said predetermined range, wherein the same rest condition obtains in each of said variable resistance elements, said means comprising a generator of intermittent electrical pulses connected in a low impedance transmission path that includes both of said variable resistance elements but which excludes said electric source.

5. An electrical trigger circuit comprising a pair of variable resistance elements and a pair of connected fixed resistors forming therewith a pair of parallel current-conduction paths, each of said variable resistance elements in combination with its connected fixed resistance having a variational characteristic which includes a predetermined range of minimum and maximum electrical quantities within which either of two stable rest conditions obtains for a given set of conditions, and outside of which only a single stable rest condition obtains for a given set of conditions, an energy storage impedance path interconnecting said conducting paths, a source of continuous unidirectional electrical current connected across said paths, the magnitude of said source being sufficient to simultaneously create across both said variable resistance elements electrical quantities in excess of said minimum and less than said maximum values, and pulse producing means operative in a low impedance pulse conducting circuit that includes both of said variable resistance elements but excludes said source of unidirectional electrical current to intermittently and momentarily change the operating conditions of said variable resistance elements to electrical quantities less than said minimum valued quantities.

6. An electrical trigger circuit comprising a pair of similar variable resistance elements each in series connection with a fixed resistor and forming therewith a pair of parallel current-conduction paths, each of said variable resistance elements in combination with its fixed resistor having a variational resistance characteristic which includes a predetermined range of current-voltage conditions within which either of two stable rest states obtains for a given set of conditions, and outside of which only a single stable rest state obtains for a given set of conditions, a capacity circuit interconnecting the junction points of said fixed and variable resistance elements in each conduction path, an external network connected across and interconnecting said parallel conduction paths, said network including a current-limited source of potential of roughly twice the magnitude corresponding to values within said predetermined range of current-voltage conditions, a capacitor shunting said current-limited source, and means to momentarily change the current from said current-limited source to a value corresponding to current-voltage conditions outside said predetermined range, said means comprising a generator of constant-current electric impulses operating in a low impedance circuit not including said current-limited source.

7. An electrical trigger circuit comprising a pair of series-type negative resistance elements each in series connection with a fixed resistor, the magnitude of which is less than the maximum negative resistance of said connected negative resistance element, said fixed resistors and negative resistance elements forming two parallel current-conducting paths, a capacity circuit interconnecting the junction points of said fixed and negative resistance elements in said paths, an external circuit connected across and interconnecting said serially-connected fixed and negative resistance elements, said external circuit comprising a current-limited source in series connection with an inductor, said current-limited source when so connected being of sufficient magnitude to bring both series-type negative resistance elements within their negative resistance range, whereby a stable rest condition is established only by unequal distribution of current in the two elements, and means to momentarily reduce the magnitude of said current-limited source to a value sufficient only to maintain both series-type connected resistance elements in their low voltage positive resistance range.

8. The combination described in the preceding claim, wherein the means to momentarily reduce the value of the current-limited source comprises a source of intermittent constant-current pulses shunted across said serially-connected inductor and current-limited source, in polarity opposition to said current-limited source.

9. An electrical trigger circuit comprising a pair of shunt-type negative resistance elements in series connection and a pair of fixed resistors in series connection and shunted across said negative resistance elements, an inductor connected between the junctions of said negative resistance elements and said fixed resistors, each of said negative resistance elements together with its connected fixed resistor having a variational resistance characteristic having a predetermined range of current-voltage conditions within which either of two stable rest states obtains for a given set of conditions, and outside of which only a single stable rest condition obtains for a given set of conditions, an external circuit connected across said serially-connected negative resistance elements and said fixed resistors, said external circuit including a source of potential the magnitude of which when so connected is sufficient to create across said negative resistance units current-voltage conditions within said predetermined range, whereby a stable rest condition of the circuit is established only by unequal distribution of current between the two elements, means to momentarily change the effective magnitude of said voltage source to create across said negative resistance elements current-voltage conditions outside of said range of negative resistance current-voltage conditions, said means comprising a source of current pulses connected in a low impedance pulse conductive path which includes said negative resistance units in series with a capacitor and said source of current pulses.

10. An electrical trigger circuit comprising in combination a pair of current-conducting paths, each of said paths including a variable impedance element which is characterized by a variational resistance characteristic having a predetermined range of current-voltage conditions within which operation in either of two stable states obtains for a given set of conditions, and outside of which operation in only one stable state obtains for a given set of conditions, a storage circuit connected to intercouple said current-conducting paths, an external network connected across said paths, said network including a source of electrical energy the magnitude of which when so connected is sufficient to give rise simultaneously to current-voltage conditions within said predetermined range in each said variable resistance elements, and means to momentarily change the effective value of said electrical potential source to give rise to current-voltage conditions outside of said range in each of said variable resistance elements, said last-mentioned means comprising a low impedance pulse transmission path which includes both of said variable resistance elements and a source of intermittent electrical pulses.

11. An electrical trigger circuit comprising a pair of variable resistance elements and a pair of connected auxiliary impedance elements forming therewith a pair of current-conductive paths, each of said variable resistive elements in combination with its said auxiliary impedance elements having a variational resistance characteristic having a predetermined range of electrical quantities within which either of two stable operating states obtains for a given set of conditions, and outside of which only one stable operating state obtains for a given set of conditions, an energy storage circuit interconnecting said current-conduction paths, an external network connected across said paths, said network including an electrical source of potential the magnitude of which when so connected is sufficient to give rise simultaneously to current-voltage conditions within said predetermined range in each of said variable resistance elements, and means to momentarily change the effective value of said electrical potential source to momentarily give rise to current-voltage conditions outside of said range in each said variable resistance elements, said last-mentioned means comprising a low impedance pulse transmission path which includes both of said variable resistance elements and a source of intermittent electrical pulses.

JAMES O. EDSON.

No references cited.